H. STAUDE & A. TRAVER,
Improvement in Evaporating Apparatus.

No. 131,979. Patented Oct. 8, 1872.

Witnesses.
Richard H Reille
J Albert Cipperly

Inventors.
Henry Staude
Alvah Traver

UNITED STATES PATENT OFFICE.

HENRY STAUDE AND ALVAH TRAVER, OF TROY, NEW YORK.

IMPROVEMENT IN EVAPORATING APPARATUS.

Specification forming part of Letters Patent No. 131,979, dated October 8, 1872.

*To all whom it may concern:*

Be it known that we, HENRY STAUDE and ALVAH TRAVER, of the city of Troy, in the county of Rensselaer and State of New York, have invented an Improved Evaporator and Purifier, of which the following is a specification:

Our invention consists of a conical or bell-shaped tube whose base is partially cut away or left open in construction, so that when the same is set in a vessel of liquid the liquid may flow readily under and into the conical tube, and the fluid therein, when heated, flow continuously through and over the top of the same until sufficiently condensed or evaporated. It also consists of a strainer or filter, in connection with such bell-shaped tube, to act in combination therewith in the process of concentrating and purifying expansive liquids, sirups, &c.; the main object of our invention being to control the ebullition of liquids in the boiling and condensing of sirups, &c., and to prevent the overflow of the same upon the stove or heating-surface; also, in the operation of boiling to cleanse and purify the liquid of sediment and scum evolved in boiling, and to prevent the same from flowing back into the vessel.

Figure 1:
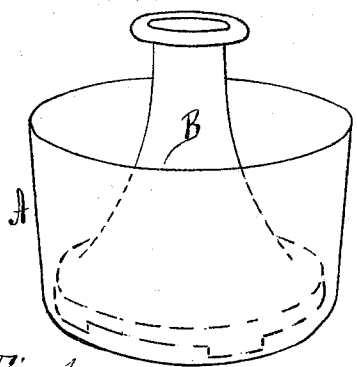
Figure 2:
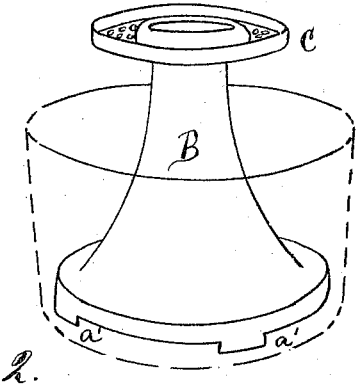
Figure 3:
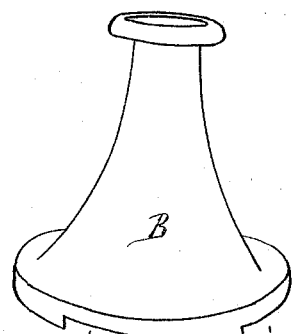
Figure 7:
Figure 4:
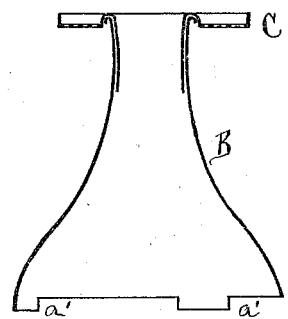
Figure 5:
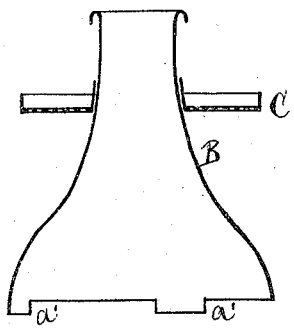
Figure 6:
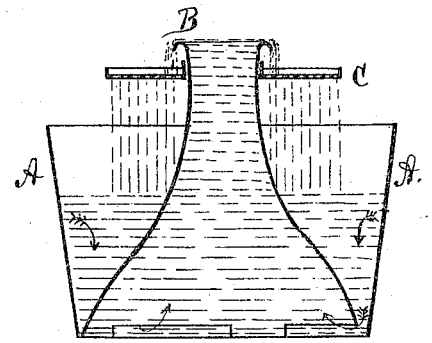

Figure 1 is an outline view of our device in a vessel without the filter. Fig. 2 is a perspective view of our device with a strainer or filter attached to or cast with the smaller end of the tube. Fig. 3 is a perspective or outline view of the conical tube alone. Fig. 4 is a vertical section of the same, showing the rim or support of the strainer sliding in the tube. Fig. 5 is a vertical section of the same with strainer sliding on the neck of the tube. Fig. 6 is a vertical section of our conical tube and filter in combitation within a vessel, showing the operation in boiling, purifying, and condensing sirups, &c. Fig. 7 is a view of a strainer or filter detached.

A is the vessel in which the liquid is poured. B is a bell-shaped or conical tube of sheet metal or other thin material, which is set upon protuberances or supports extending downward from the dome, so that space is afforded for the currents to flow freely therein, as shown in operation in Fig. 6. C is the filter or open-work screen, made of metal or other suitable material and attached to or cast with the neck of the tube, as shown, in different positions.

The bell-shaped tube B should be proportioned in size to the vessel in which it is placed. In operation we find that it is better that its inner capacity should be nearly that of the vessel in which the liquid is boiled, and that the diameter at the base should be nearly that of the vessel, and that the upper end of the tube should extend up higher than the vessel, and that the smaller end of the tube should have a suitable flange or lip around the contracted orifice, so that the liquid can flow over the same smoothly and evenly.

The screen C may be at any height desired, though we prefer the same just below the upper end of the tube, as seen in Fig. 6.

The vessel, having been filled with sirup or other expansive liquid to be concentrated and purified by boiling, is placed on the stove or other heated surface, and as the fluid becomes heated that within the dome expands, the steam dampens the tube above, and the liquid is compressed and forced upward, and continuously flows over the flanged orifice until the sirup, &c., is sufficiently condensed; and, at the same time, while the boiling and flowing over are going on the screen receives the scum and sediment evolved in boiling, and from the screen or filter C the scum and dirt may be readily removed. To aid in this screening operation a cloth may be spread over the open-work strainer, or the same may consist of a net-work of fine wire, so that in operation, when the sirups are sufficiently condensed or concentrated, the same will be effectually screened or purified from the dirt; and our device may be so constructed, substantially as described, as not only to be advantageous in concentrating saccharine or fruit sirups, but also useful in boiling, condensing, and purifying fluids, in every family, and prevent waste and loss of fluids from boiling over on the stove, and the disagreeable odors arising from the same.

*Claim.*

1. The conical or bell-shaped tube B with openings underneath the base, substantially as described, for purpose set forth.

2. The combination of a bell-shaped or conical-shaped tube, or its equivalent, with a vessel, in the boiling and condensing fluids.

3. The tube B, in connection with a strainer, C, or their equivalents, in combination with a vessel for evaporating and purifying sirups, &c., substantially as described and set forth.

HENRY STAUDE.
ALVAH TRAVER.

Witnesses:
RICHARD H. REILLE,
J. ALBERT CIPPERLY.